United States Patent
Paul et al.

(10) Patent No.: US 10,461,604 B2
(45) Date of Patent: Oct. 29, 2019

(54) OIL DISTRIBUTION ELEMENT

(71) Applicant: ThyssenKrupp Presta TecCenter AG, Eschen (LI)

(72) Inventors: Daniel Paul, Burkhardtsdorf (DE); Christian Kötschau, Chemnitz (DE)

(73) Assignee: THYSSENKRUPP PRESTA TECCENTER AG, Eschen (LI)

(*) Notice: Subject to any disclaimer, the term of this patent is extended or adjusted under 35 U.S.C. 154(b) by 357 days.

(21) Appl. No.: 15/315,688

(22) PCT Filed: May 18, 2015

(86) PCT No.: PCT/EP2015/060910
§ 371 (c)(1),
(2) Date: Dec. 1, 2016

(87) PCT Pub. No.: WO2015/185350
PCT Pub. Date: Dec. 10, 2015

(65) Prior Publication Data
US 2018/0191225 A1  Jul. 5, 2018

(30) Foreign Application Priority Data
Jun. 4, 2014  (DE) .................. 10 2014 107 845

(51) Int. Cl.
*H02K 9/10* (2006.01)
*H02K 7/00* (2006.01)
(Continued)

(52) U.S. Cl.
CPC ............... *H02K 7/003* (2013.01); *H02K 9/10* (2013.01); *H02K 9/19* (2013.01); *H02K 9/193* (2013.01)

(58) Field of Classification Search
CPC ........ B60K 7/0007; B60K 7/00; B60K 17/14; B60K 17/046; B60K 17/12;
(Continued)

(56) References Cited

U.S. PATENT DOCUMENTS

| 3,809,933 A | 5/1974 | Sugawara et al. |
| 2003/0146667 A1 | 8/2003 | Hattori et al. |

(Continued)

FOREIGN PATENT DOCUMENTS

| CH | 337267 A | 3/1959 |
| DE | 199 13 199 A1 | 10/2000 |

(Continued)

OTHER PUBLICATIONS

English language Abstract for DE 199 13 199 A1 listed above.
(Continued)

*Primary Examiner* — Nguyen Tran
*Assistant Examiner* — Bryan R Perez
(74) *Attorney, Agent, or Firm* — thyssenkrupp North America, Inc.

(57) ABSTRACT

A hollow rotor shaft for a rotor of an electrical machine may include a cylinder barrel closed off by face flanges on both sides. The cylinder barrel may enclose a shaft cavity. A shaft journal may be configured on each face flanges. An inlet may be disposed in one of the shaft journals by way of which a cooling fluid may pass into the shaft cavity and onto an inner surface of the cylinder barrel. A distribution element may be disposed in the shaft cavity. The distribution element may receive the cooling fluid that enters through the inlet, conduct the cooling fluid in a direction of the inner surface of the cylinder barrel by way of a rotation-symmetrical drainage surface, and give off the cooling fluid to the inner surface by way of a mouth region.

15 Claims, 2 Drawing Sheets

(51) Int. Cl.
*H02K 9/193* (2006.01)
*H02K 9/19* (2006.01)

(58) Field of Classification Search
CPC .... B60K 2007/0038; B60K 2007/0092; H02K 7/116; H02K 7/14; H02K 9/19; H02K 9/083; H02K 9/006; H02K 9/08; H02K 9/16; H02K 9/197; H02K 1/32; H02K 2209/00; F16H 2001/325; F16H 57/0426; F16H 57/048; F16H 57/0452; F16H 57/0441; F16H 57/043; F16H 57/0471; F16H 57/0409; F16H 57/0423; F16H 57/0476; B60Y 2306/03; Y02T 10/641
USPC ................................. 310/58, 59, 60 R, 61
See application file for complete search history.

(56) References Cited

U.S. PATENT DOCUMENTS

| | | | |
|---|---|---|---|
| 2007/0273232 A1* | 11/2007 | Ong | H02K 1/28 310/156.01 |
| 2009/0261667 A1 | 10/2009 | Matsubara et al. | |
| 2010/0201294 A1* | 8/2010 | Yuuki | B60L 15/025 318/400.3 |
| 2011/0101815 A1* | 5/2011 | Finkle | H02K 21/028 310/191 |
| 2012/0025642 A1 | 2/2012 | Onimaru et al. | |
| 2012/0299404 A1* | 11/2012 | Yamamoto | H02K 1/2766 310/61 |

FOREIGN PATENT DOCUMENTS

| | | |
|---|---|---|
| DE | 103 30 295 A1 | 1/2005 |
| DE | 10 2009 012 324 A1 | 9/2010 |
| DE | 11 2010 004 773 T5 | 10/2012 |
| DE | 10 2011 052 085 A1 | 1/2013 |
| DE | 11 2009 004 739 T5 | 1/2013 |
| DE | 10 2011 117 517 A1 | 5/2013 |
| DE | 10 2012 203 697 A1 | 9/2013 |
| EP | 0 659 308 B1 | 5/1996 |
| EP | 0 921 623 A2 | 6/1999 |
| EP | 0 989 658 A1 | 3/2000 |
| EP | 1953896 A1 | 8/2008 |
| EP | 2 528 197 A2 | 11/2012 |
| EP | 2 667 486 A2 | 11/2013 |
| GB | 2099229 A | 12/1982 |
| JP | 2004-129407 A | 4/2004 |
| JP | 2009118693 A | 5/2009 |

OTHER PUBLICATIONS

English language Abstract for DE 103 30 295 A1 listed above.
English language Abstract for DE 10 2011 052 085 A1 listed above.
English language Abstract for DE 10 2011 117 517 A1 listed above.
English language Abstract for EP 0 659 308 B1 listed above.
English language Abstract for EP 0 921 623 A2 listed above.
English language Abstract for EP 0 989 658 A1 listed above.
English translation of International Search Report for International patent application No. PCT/EP2015/060910; dated Sep. 15, 2015.
English language Abstract of JP 2004-129407 A listed above.

* cited by examiner

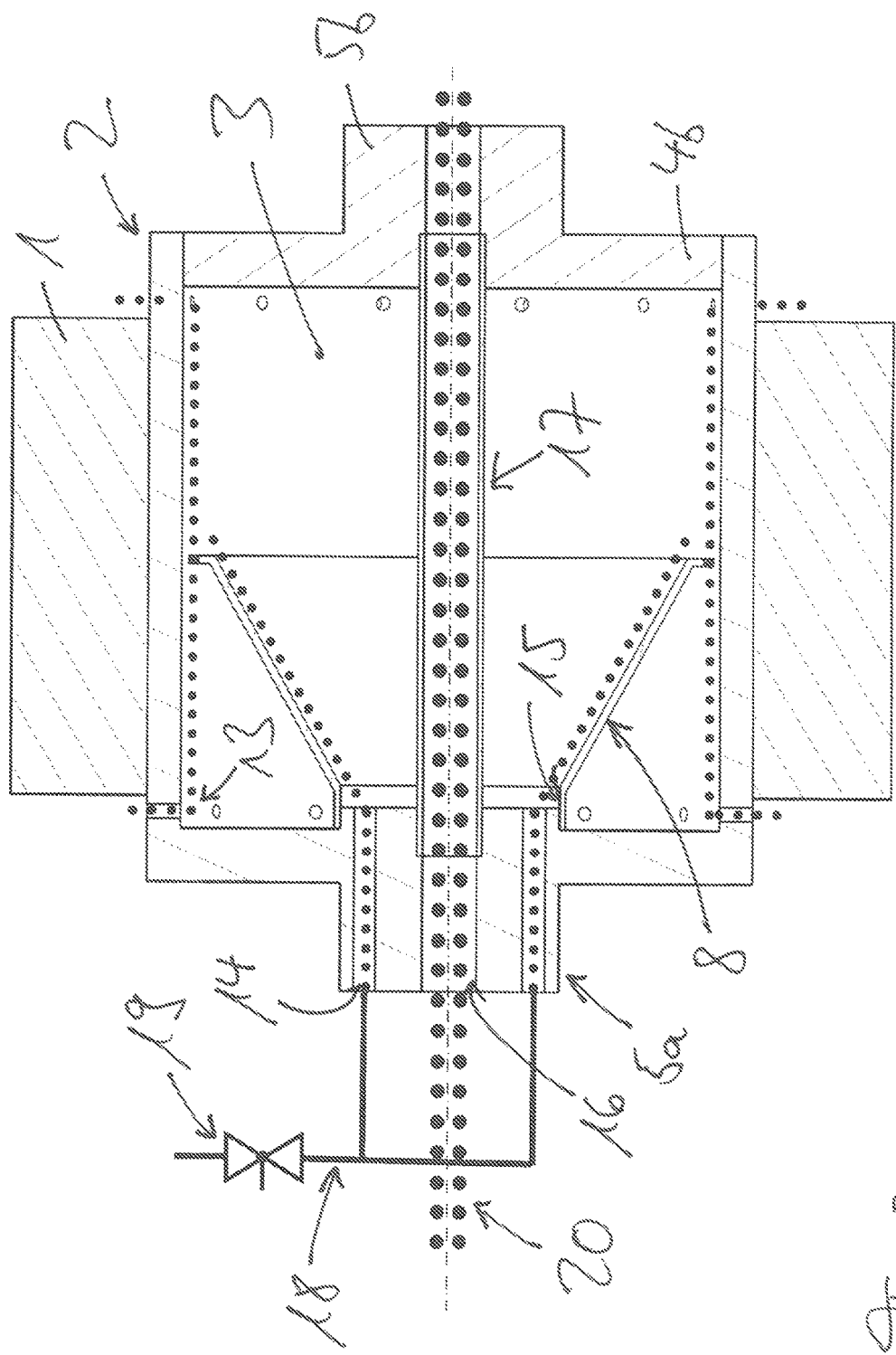

10,461,604 B2

OIL DISTRIBUTION ELEMENT

CROSS REFERENCE TO RELATED APPLICATIONS

This application is a U.S. National Stage Entry of International Patent Application Serial Number PCT/EP2015/060910, filed May 18, 2015, which claims priority to German Patent Application No. DE 10 2014 107 845.4 filed Jun. 4, 2014, the entire contents of both of which are incorporated herein by reference.

FIELD

The present disclosure generally relates to hollow rotor shafts for electrical machines and devices for distributing oil throughout such hollow rotor shafts.

BACKGROUND

A plurality of such rotors for electrical machines, having metal sheets laminations disposed on them, which are generally combined into bundles, is known from the state of the art. They are used, for example, in asynchronous machines and in permanently excited synchronous machines. All electrical machines are greatly heated during operation, because of the electromagnetic activity in the rotor and as the result of the heat transfer to other weight-optimized supporting components that takes place. Different concepts for fluid cooling, to limit heating, are known from the state of the art. In this regard, the known cooling systems are accompanied by a specific rotor design, which makes use of special coolant guide structures, for example. Other concepts also require a great number of additional components, which influence not only the design of the rotor but also that of the machine and the interface components.

Different solutions for guidance and distribution of the cooling medium to the heat transfer surface are also known, most of which have a complete line for the coolant, in channels or bores, laid out over the entire axial and radial path distance, as a compulsory guide. Such compulsory guides bring about a great pressure loss, caused by the flow resistance, so that coolant pumps become necessary, particularly if a flow direction opposite to centrifugal force is included. Furthermore, implementation of these concepts is particularly complicated because of the great number of bores, particularly axial hole bores.

Certain types of cooling, as they are shown, for example, in DE 11 2010 004 773, integrate additional components into the rotor, but these require additional mounting and sealing. Furthermore, electrical machines having hollow shafts are also known, for example from CH 337267, in which machines the entire cavity of the rotor must be filled with fluid in order to achieve sufficient interaction of the cooling fluid with the rotor cylinder barrel, and good heat transfer. However, it has been shown that it is not possible to conduct a sufficient amount of heat away in this manner.

Ultimately, all known cooling devices have one of the following disadvantages: Either overly small cross-sections of the lines provided for the coolant are selected, in order to reduce the volume requirement. However, such small passage bores hardly reduce the weight of the rotor shaft to be cooled. Furthermore, the coolant can be conducted to the components to be cooled, particularly to the sheet-metal packet, which particularly heats up, only to a slight extent, because the surfaces are small, in any case. The coolant often wets only small surface areas of the heated surface, and no large-area distribution over the entire circumference comes about.

On the other hand, not only a large surface for heat transfer but also a particularly easy method of construction can be implemented with large line cross-sections and cavities in the rotor shaft. However, in this case it is disadvantageous that the hollow cylinder must be filled almost completely with coolant during operation, which increases the coolant requirement and in turn leads to an increase in the moving mass, something that was specifically supposed to be avoided by the light-construction design.

BRIEF DESCRIPTION OF THE FIGURES

FIG. 2 is a sectional view of an example rotor-integrated cooling system with a separate media transport.

DETAILED DESCRIPTION

Figure 1:
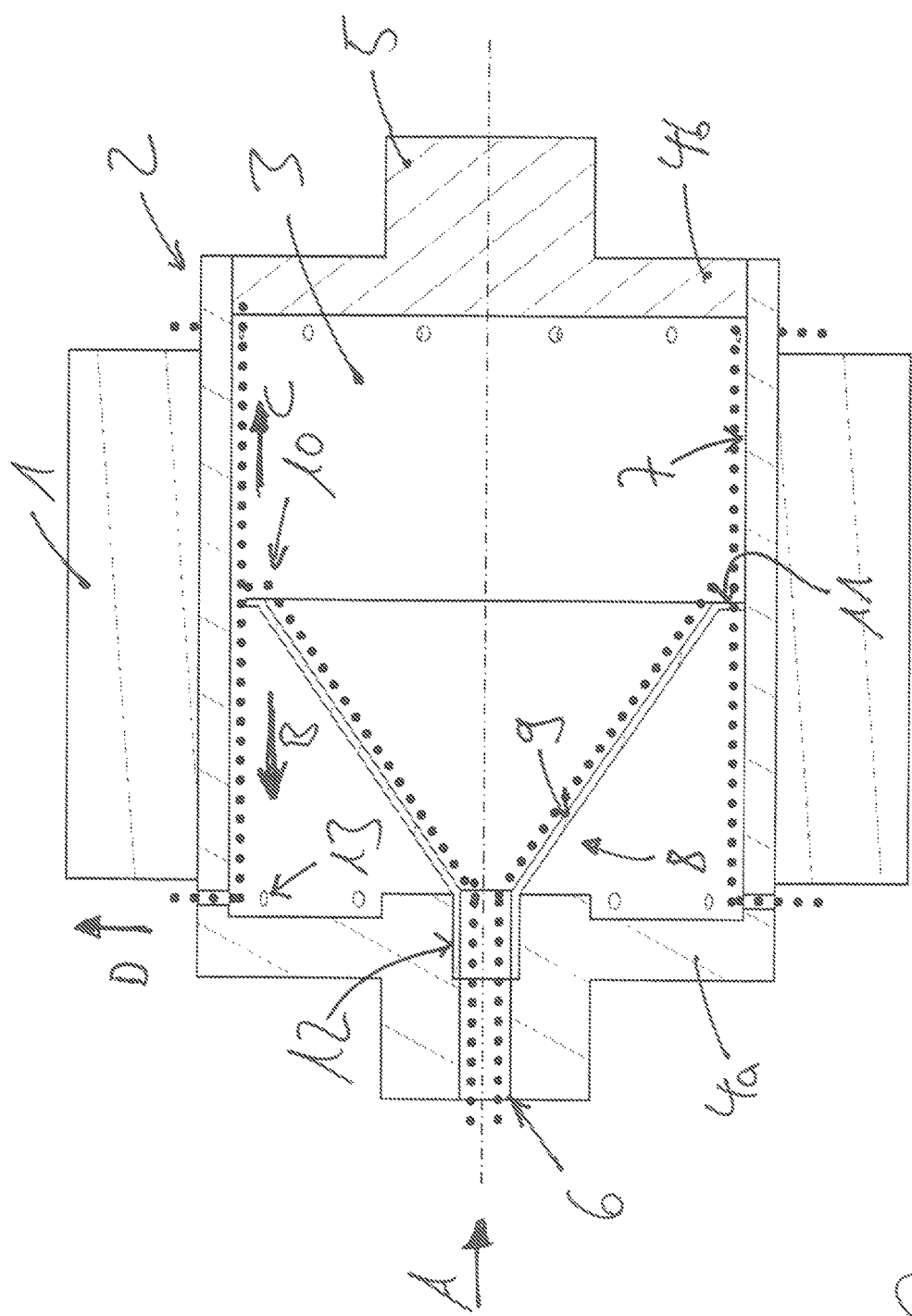
FIG. 1 is a sectional view of an example rotor-integrated cooling system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to create a rotor shaft for a rotor of an electrical machine. In some examples, the rotor shaft may have a simple structure, may be cost-advantageously produced, and can make particularly efficient cooling possible. Furthermore, another example object is to propose a corresponding rotor. Along those lines, the present disclosure generally concerns hollow rotor shafts for rotors of electrical machines. In some cases, the hollow rotor shafts may include a cylinder barrel closed off on both sides by face flanges. The cylinder barrel may enclose a hollow shaft space, wherein a shaft journal is positioned at each of the face flanges. An inlet may be disposed in one of the face flanges or, more specifically, in one of the shaft journals, by way of which inlet a cooling fluid passes into the hollow shaft space and to the inner surface of the cylinder barrel.

In accordance with the claims, the essential aspect of the invention lies in the special distribution element, which is disposed in the large-volume cylindrical cavity of the shaft. Furthermore, the distribution element leads to an efficient and circumferentially uniformly distributed impact, on the inner surface of the cylinder barrel that encloses the cavity, by a relatively small but sufficient amount of cooling fluid that flows through. In this regard, a large-volume cavity is considered to be one in which the ratio of the diameter of the shaft space to the diameter of the shaft journal (particularly the diameter of the bearing) is greater than 1.5, in particular greater than 2. With the distribution element according to the invention, the cooling fluid is passed through and has an optimal interaction with the inner surface, so that particularly efficient cooling of the rotor takes place. According to the invention, no complete flushing but rather merely wetting, with cooling fluid, of the surface to be cooled therefore takes place.

Because of the low temperatures, greater output of the rotor can be achieved, specifically at a defined component limit temperature, so that an improved output weight or output volume of the electrical machine is obtained. With the invention, a light-construction-oriented concept of the rotor, with low use of coolant and particularly efficient cooling, is therefore possible. In this regard, it is particularly advantageous that the mass to be rotated remains low, in spite of the coolant content.

According to the claim, the hollow rotor shaft has a cylinder barrel closed off by face flanges on both sides, which cylinder barrel encloses the shaft cavity. A shaft journal is configured at each of the face flanges, in each instance, wherein a passage bore is provided as an inlet in a shaft journal. By way of this inlet, there is access to the shaft cavity, so that cooling fluid introduced into the inlet gets into the shaft cavity and thereby to the inner surface of the cylinder barrel. Directly behind the inlet, the distribution element is disposed in the shaft cavity; this element takes up cooling fluid that enters by way of the inlet, and distributes it to the planned location. For this purpose, the distribution element has a drainage surface, which is particularly rotation-symmetrical, in order to avoid imbalances, and with which the cooling fluid is guided outward in the direction of the inner surface of the cylinder barrel with a radial component, and is given off to the inner surface by way of a mouth region. In this regard, the kinetic energy of the rotor is used for transport of the cooling medium. Therefore the coolant transport runs from the rotor axis to the location of heat exchange, driven by centrifugal force. Discharge of the coolant can take place through openings that are provided in the cylinder barrel or in the outer region of the face flanges.

It is a particular advantage of the distribution element that only slight structural changes have to be made in the constructed rotor in order to implement the cooling concept. The additional distribution element can be connected with the rotor and the feed lines by way of a simple connection geometry, so that a simple cooling system structure, with a minimal number of additional components, is obtained. The invention can be implemented to particular advantage in multi-part, constructed, light-design rotor shafts.

According to the invention, a small amount of coolant and a correspondingly small volume stream flows through only as much of the entire shaft cavity so that merely the inner cylinder barrel surface of the shaft cavity, which is essential for heat exchange, is wetted. During this process, full-circumference coolant wetting already takes place when the coolant impacts the surface to be cooled. The fluid coolant and its direct wetting of the wall at the location of heat formation thereby contribute to optimal heat removal, in spite of a small coolant amount. Because of the small coolant amount, only a minimal increase of the moving masses, and therefore of the moment of inertia, accordingly comes about.

With the cooled components, the output of the electrical machine can thereby be additionally increased, and the influence of cooling on the acceleration behavior can be minimized. A further advantage lies in that the fluid cooling according to the invention is accompanied by insignificant structural changes in the rotor, and can actually be implemented as a modular solution, with minimal additional effort.

The advantages mentioned are particularly marked if the rotation-symmetrical drainage surface of the distribution element forms a conical funnel having a smooth inner surface, wherein the opening angle of the funnel opens into the shaft cavity. In this regard, the inner surface can be straight or arched in such a manner that the opening angle continues to increase into the shaft cavity. In order to be able to reliably guarantee the planned cooling function, with a uniform distribution of the coolant, it is advantageous if the radius of the funnel mouth, by way of which the cooling fluid gets onto the inner wall of the cylinder barrel, is larger than at least half of the inside radius of the cylinder barrel.

In this regard, it is particularly advantageous, with respect to good transfer of the cooling fluid to the inner wall of the cylinder barrel and uniform distribution of the cooling fluid, if the mouth region of the drainage surface, in other words particularly the funnel mouth, has a slight distance from the inner surface of the cylinder barrel. Spacers are provided to bridge the distance, along which spacers the cooling fluid can run onto the inner surface of the cylinder barrel. Ideally, the spacers are symmetrically distributed over the circumference of the funnel mouth and lie against the inner surface of the cylinder barrel.

In an embodiment that has a particularly simple structure and is weight-reduced, the drainage surface is produced from a thin-walled material, particularly from a plastic or a sheet metal, wherein the spacers are accordingly formed onto the mouth region or cut out from it.

In order for the cooling fluid to distribute uniformly in both directions after it impacts the inner surface of the cylinder barrel, it is advantageous if the mouth region of the drainage surface is situated approximately in the middle of the axial expanse of the inner surface. The cooling fluid given off at this location is distributed almost homogeneously over the inner surface, toward both sides, when the hollow rotor shaft is rotating. Possible non-homogeneities can be balanced out by way of a slight change in position.

In the simplest case, the cooling fluid of the drainage surface is supplied by way of a central inlet introduced into the shaft journal. In this regard, the neck connector of the funnel, which opens into the drainage surface, can directly define the width of the inlet. The drainage surface, configured as a funnel, can be fitted directly into an accommodation that surrounds the inlet with its neck connector.

However, in another advantageous embodiment, the inlet can have multiple inlet channels evenly distributed over the circumference of the shaft journal, which open into the neck connector. The cooling fluid supplied by way of such channels, in separate streams, is then homogenized on the drainage surface by means of the rotation and the resulting centrifugal force. In this embodiment, not only the cooling, according to the invention, but also a further separate media transport by the rotor can be implemented. For this purpose, a transit element, particularly in the form of a pipe piece, is provided within the hollow rotor shaft, which element projects through the cavity from one shaft journal to the other. In this way, a combined arrangement for rotor-integrated cooling, with separate media transport through the rotor shaft, is obtained. The two media streams can be conducted in and out separately, and can therefore also be turned on and off for different operating states.

As has been explained, discharge of the coolant can take place by means of openings in the cylinder barrel or in the face flanges. However, it is particularly advantageous to utilize the cooling fluid situated in the shaft cavity, which fluid is to be conducted away, in order to cool the stator coils that surround the rotor. For this purpose, exit openings are provided in the inner surface of the cylinder barrel, at the end of the flow, from which openings the cooling fluid is ejected in the radial direction when the hollow rotor shaft is turning and wets the surrounding stator, moving past the rotor. In order to achieve uniform wetting, it is advantageous if the exit openings are disposed in the edge regions of the cylinder barrel, uniformly distributed over the circumference, in each instance.

The coolant stream and the amount of coolant present in the rotor can be adjusted by way of the number and the diameter of the individual inlet channels, as well as the number and the diameter of the exit openings uniformly distributed over the circumference, and consequently, the cooling output can be regulated.

In summary, the rotor shaft according to the invention is built in multiple parts and has a hollow cylinder. With this design, a large inner surface for heat transfer to the cooling fluid is implemented. In this regard, the rotor has a cooling fluid feed on a face side, which feed can consist of multiple feed lines under some circumstances, and can be configured as a central axial bore of a component that is part of the rotor shaft. The feed opens into the distribution element, which begins directly with the radial widening of the hollow-cylinder region of the rotor shaft. By means of this arrangement, a sudden, massive increase in cross-section, as it is typical for a light-construction rotor design, is bridged. After transfer of the cooling fluid to the distribution element, the cooling fluid is guided to the inner cylinder barrel surface of the constructed rotor, as the result of the rotation of the rotor and the resulting centrifugal force, as well as the pressure difference between coolant circuit and rotor surroundings. In this connection, the cooling fluid impacts the inner surface of the cylindrical shaft cavity almost centrally. This central introduction of the medium, as well as its circumferential distribution during the flow distance from the coolant entry to delivery to the inner surface, are the tasks of the coolant distribution element. Because of the additional coolant flowing in and the centrifugal forces, a distribution of the flow subsequently occurs, which guides the coolant axially outward on both sides. In this regard, the number and the diameter of the coolant feed lines must be designed in such a manner that efficient cooling is achieved at the lowest possible consumption of energy and volume of the coolant. Here, the coolant distribution element is connected with the feed line element with force fit, material fit or shape fit.

The sudden increase in cross-section within the hollow shaft guarantees a particularly light design and a tremendous increase in the surface area available for heat transfer. It is advantageous that the cooling fluid is guided to the inner surface of the cylindrical shaft cavity in targeted manner and there can flow along the active sheet-metal packet to be cooled, particularly close to it. It is evident that the entire cavity is not filled with coolant, but rather only the inner cylinder barrel surface is impacted by a coolant film, over its full extent. Distribution of the coolant takes place using centrifugal force. This concentrated, targeted use of the coolant, implemented with low volume streams, reduces the masses to be moved rotationally, while simultaneously optimizing cooling of the regions to be cooled.

By means of the direct transfer of the cooling fluid to the distribution element upon entry into the large hollow-cylinder space, compulsory guidance of the coolant, reduced to the minimally required extent, is achieved. This reduces the pressure losses and the flow resistances. As a result, it is possible to avoid use of a coolant pump. Furthermore, the axially direct transfer of the coolant simplifies the design of the coolant feed lines and reduces the production effort. Upon transfer, the coolant flows freely over the coolant distribution element and is already distributed in the circumference direction, for the most part, on the flow path until it impacts the inner surface of the pipe in the center. Therefore the coolant does not impact on the inner surface locally, through exit openings that are limited in terms of number and shaping, but rather almost over the full circumference, and a uniform coolant flow can form on the surface. This promotes heat transfer to and from the surface to be cooled.

In FIG. 1, first a rotor for an electrical machine, particularly for an asynchronous motor or a permanently excited synchronous machine, is shown, which has a hollow rotor shaft equipped with bundles of laminations 1. The hollow rotor shaft is formed by a cylinder barrel 2, which encloses a shaft cavity 3 and is closed off, on both sides, by face flanges 4. In the present case, the one face flange 4a is formed on the cylinder barrel 2, while the other face flange 4b is fitted into the cylinder barrel 2. A shaft journal 5 is provided at both face flanges 4, in each instance, which journal is formed on or attached as a separate component. In one of the shaft journals 5, an inlet 6 is provided, by way of which a cooling fluid (dots) gets into the shaft cavity 3 and to the inner surface 7 of the cylinder barrel, in the direction of the arrow A.

In the shaft cavity 3, a distribution element 8 is disposed, which takes up the cooling fluid that enters by way of the inlet 6, and leads it in the direction of the inner surface 7 of the cylinder barrel by way of a drainage surface 9, particularly one with rotation symmetry. The cooling fluid is given off to the inner surface 7 by way of a mouth region 10 of the drainage surface 9. In the present case, the drainage surface is configured as a thin-walled conical funnel having a smooth, straight inner surface, which funnel opens into the shaft cavity 3 at an opening angle and is spaced apart from the inner radius of the cylinder barrel at only a slight distance, with the funnel mouth 10. The remaining distance is bridged by formed-on spacers 11, on which the cooling fluid runs down and then distributes homogeneously in both directions (arrows B, C). The spacers 11 touch the inner surface 7. The funnel-shaped distribution element 8 is fitted, with its neck 12, into a corresponding accommodation in the face flange 5.

In the cylinder barrel 2, exit openings 13 are provided, from which the cooling fluid exits in the radial direction (arrow D) when the hollow rotor shaft is turning and wets the surrounding stator. The exit openings 13 are evenly distributed over the circumference in both edge regions of the cylinder barrel 2, in each instance, and ensure that the heated cooling fluid is conducted away. The exit openings 13 of the one edge region are disposed over the circumference with an offset relative to the exit openings of the other edge region, on the angle bisector, in order to allow the remaining oil to drain away at every angle position of the rotor. Due to the oil draining away completely, an imbalance of the rotor upon startup is particularly prevented. As the result of passing the cooling fluid out, an air/cooling fluid mixture occurs in the direct surroundings of the rotor and stator, which mixture additionally leads to cooling of the rotor and of the stator. By means of this effect, active cooling of the stator winding heads can be achieved by spraying.

The rotor shown in FIG. 2 has a similar structure. The same reference symbols apply for the same parts. In contrast to the embodiment according to FIG. 1, this rotor has multiple inlet channels 14 evenly distributed over the circumference of the shaft journal 5a, which open into the neck region 15 of the distribution element 8. The inlet channels 14 are supplied with cooling fluid by way of a feed line 18, wherein the flow through the feed line 18 can be adjusted by way of a valve 19. In this rotor, a coaxial access bore 16 is furthermore provided in the shaft journal 5a, into which bore a transit element in the form of a pipe piece 17 is fitted, forming a seal against the shaft cavity 3. The pipe piece 17 leads through the surrounding shaft cavity 3 all the way to the other shaft journal 5b, where it is also fitted in, forming a seal against the shaft cavity 3. The pipe piece 17 allows a liquid or gaseous medium 20 (dots) to be passed through separately.

The coolant stream and the available coolant amount in the rotor can be adjusted by way of the valve 19, the number and the diameter of the inlet channels 14, as well as the number and diameter of the exit openings 13, and consequently the coolant output can be regulated.

REFERENCE SYMBOL LIST 1 bundle of laminations
2 cylinder barrel
3 hollow shaft space
4 face flange
5 shaft journal
6 inlet
7 inner surface of the cylinder barrel
8 distribution element
9 drainage surface
10 mouth region
11 spacers
12 neck
13 exit openings
14 inlet channels
15 neck region
16 access bore
17 pipe piece
18 feed line
19 valve
20 medium

What is claimed is:

1. A hollow rotor shaft for a rotor of an electric machine, the hollow rotor shaft comprising:
    a cylinder barrel enclosing a shaft cavity and closed off on a first side by a face flange and closed off on a second side by a face flange, wherein a shaft journal is disposed or formed on each of the face flanges;
    an inlet disposed in one of the face flanges that permits a cooling fluid to pass into the shaft cavity and to an inner surface of the cylinder barrel; and
    a distribution element disposed in the shaft cavity, wherein the distribution element is configured to
       receive the cooling fluid that enters by way of the inlet, conduct the cooling fluid in a direction of the inner surface of the cylinder barrel by way of a drainage surface, and
       provide the cooling fluid to the inner surface by way of a mouth region of the drainage surface,
    wherein the drainage surface of the distribution element comprises a conical funnel having a smooth inner surface that is straight or arched, with the conical funnel opening into the shaft cavity at an opening angle.

2. The hollow rotor shaft of claim 1 wherein the inlet comprises multiple inlet channels that are evenly distributed over a circumference of one of the shaft journals, wherein the multiple inlet channels open into a neck region of the conical funnel.

3. The hollow rotor shaft of claim 1 wherein a radius of the mouth region is greater than half an inner radius of the cylinder barrel.

4. The hollow rotor shaft of claim 1 wherein the mouth region of the drainage surface is spaced apart from the inner surface of the cylinder barrel by a distance, wherein the distance is bridged by spacers that are symmetrically distributed about a circumference of the mouth region and lie against the inner surface of the cylinder barrel.

5. The hollow rotor shaft of claim 4 wherein the drainage surface comprises plastic or sheet metal, wherein the spacers are disposed on the mouth region.

6. The hollow rotor shaft of claim 1 wherein the mouth region is positioned approximately in a center of an axial expanse of the inner surface, wherein the cooling fluid given off at the center of the axial expanse of the inner surface when the hollow rotor shaft is turning is distributed over the inner surface substantially homogeneously axially towards both the first and second sides of the cylinder barrel.

7. The hollow rotor shaft of claim 1 further comprising exit openings in the inner surface of the cylinder barrel from which the cooling fluid can exit in a radial direction when the hollow rotor shaft is turning, wherein the cooling fluid that exits through the exit openings wets a stator that surrounds the rotor.

8. The hollow rotor shaft of claim 7 wherein the exit openings are disposed in edge regions of the inner surface along the first and second sides of the cylinder barrel, with the exit openings being distributed evenly over a circumference of the inner surface of the cylinder barrel.

9. The hollow rotor shaft of claim 7 wherein the exit openings in the edge region along the first side of the cylinder barrel are circumferentially offset relative to the exit openings in the edge region along the second side of the cylinder barrel.

10. The hollow rotor shaft of claim 1 wherein at least one of the face flanges is formed integrally with the cylinder barrel.

11. The hollow rotor shaft of claim 1 wherein a shape of the drainage surface is symmetrical.

12. A rotor having a hollow rotor shaft equipped with bundles of laminations, the hollow rotor shaft comprising:
    a cylinder barrel enclosing a shaft cavity and closed off on a first side by a face flange and closed off on a second side by a face flange, wherein a shaft journal is disposed or formed on each of the face flanges;
    an inlet disposed in one of the face flanges that permits a cooling fluid to pass into the shaft cavity and to an inner surface of the cylinder barrel; and
    a distribution element disposed in the shaft cavity, wherein the distribution element is configured to
       receive the cooling fluid that enters by way of the inlet, conduct the cooling fluid in a direction of the inner surface of the cylinder barrel by way of a drainage surface, and
       provide the cooling fluid to the inner surface by way of a mouth region,
    wherein the drainage surface of the distribution element comprises a conical funnel having a smooth inner surface that is straight or arched, with the conical funnel opening into the shaft cavity at an opening angle.

13. An electric machine comprising a rotor having a hollow rotor shaft equipped with bundles of laminations, the hollow rotor shaft comprising:
- a cylinder barrel enclosing a shaft cavity and closed off on a first side by a face flange and closed off on a second side by a face flange, wherein a shaft journal is disposed or formed on each of the face flanges;
- an inlet disposed in one of the face flanges that permits a cooling fluid to pass into the shaft cavity and to an inner surface of the cylinder barrel; and
- a distribution element disposed in the shaft cavity, wherein the distribution element is configured to
   receive the cooling fluid that enters by way of the inlet,
   conduct the cooling fluid in a direction of the inner surface of the cylinder barrel by way of a drainage surface, and
   provide the cooling fluid to the inner surface by way of a mouth region,
   wherein the drainage surface of the distribution element comprises a conical funnel having a smooth inner surface that is straight or arched, with the conical funnel opening into the shaft cavity at an opening angle.

14. The electric machine of claim 13 comprising an asynchronous motor.

15. The electric machine of claim 13 comprising a permanently excited synchronous machine.

* * * * *